United States Patent
Hillborg

(10) Patent No.: US 10,546,389 B2
(45) Date of Patent: Jan. 28, 2020

(54) DEVICES AND METHODS FOR IDENTIFYING AN OBJECT IN AN IMAGE

(71) Applicant: Elekta AB (Publ), Stockholm (SE)

(72) Inventor: Mikael Hillborg, Uppsala (SE)

(73) Assignee: ELEKTA AB (PUBL), Stockholm (SE)

( * ) Notice: Subject to any disclaimer, the term of this patent is extended or adjusted under 35 U.S.C. 154(b) by 104 days.

(21) Appl. No.: 15/947,693

(22) Filed: Apr. 6, 2018

(65) Prior Publication Data

US 2019/0311493 A1    Oct. 10, 2019

(51) Int. Cl.
| | |
|---|---|
| G06K 9/00 | (2006.01) |
| G06T 7/73 | (2017.01) |
| G06N 3/04 | (2006.01) |
| G06F 17/18 | (2006.01) |
| G06T 7/00 | (2017.01) |

(52) U.S. Cl.
CPC .............. *G06T 7/74* (2017.01); *G06F 17/18* (2013.01); *G06N 3/0454* (2013.01); *G06T 7/0012* (2013.01); *G06T 2210/12* (2013.01)

(58) Field of Classification Search
None
See application file for complete search history.

(56) References Cited

U.S. PATENT DOCUMENTS

| | | | |
|---|---|---|---|
| 9,224,068 B1 * | 12/2015 | Ranzato | G06K 9/6227 |
| 9,418,319 B2 * | 8/2016 | Shen | G06K 9/4628 |
| 2017/0364771 A1 * | 12/2017 | Pinheiro | G06K 9/00201 |
| 2018/0285686 A1 * | 10/2018 | Pinheiro | G06F 15/76 |

* cited by examiner

*Primary Examiner* — Soo Jin Park
(74) *Attorney, Agent, or Firm* — Finnegan, Henderson, Farabow, Garrett & Dunner LLP

(57) ABSTRACT

Methods, devices, and computer-readable storage media for identifying an object in an image, the method including using a first neural network to identify an approximate position of an object of interest in an image and identifying based on the approximate position, a section of the image that includes the object of interest. A plurality of sub-images corresponding to the identified section of the image are applied to a plurality of second neural networks to determine a plurality of second positions of the object of interest. The plurality of second positions are statistically analyzed to determine an output position of the object of interest.

27 Claims, 10 Drawing Sheets

DEVICES AND METHODS FOR IDENTIFYING AN OBJECT IN AN IMAGE

TECHNICAL FIELD

This disclosure relates to identifying an object in an image. More specifically, this disclosure relates to devices and methods for using neural networks to identify an object of interest in an image.

BACKGROUND

Fiducial markers are used in medical imaging technologies for reference. Image processing algorithms have been used to identify such markers in an image. Conventional image processing algorithms use templates limiting identification to a certain orientation and size of an object of interest. Identification of fiducial markers and other objects of interest is important in the field of medicine, since it can facilitate diagnosis and treatment.

The use of deep neural networks can improve on conventional image processing techniques by allowing identification of objects of interest of any size or resolution in an image. While use of deep neural networks seems promising, one challenge of deep networks is their requirement for large and preferably high-resolution training sets. The use of deep neural networks for identification of objects in medical imagery is constrained by the nature of medical images, which are often coarse and few in number. In addition, due to privacy concerns, large data sets of medical images are not freely available. These aspects of medical imagery make it difficult to take advantage of the features of deep neural networks.

Accordingly, there is a need for a new automatic image object detection method to improve object detection performance on medical images or related fields.

SUMMARY

Certain embodiments of the present disclosure relate to a computer-implemented method for identifying an object in an image. The method includes: receiving by one or more processors an image having one or more objects of interest; using a first neural network to identify an approximate position of an object of interest in the received image; identifying, by the one or more processors, based on the identified approximate position, a section of the received image that includes the object of interest; obtaining, by the one or more processors, a plurality of sub-images corresponding to the identified section of the received image; applying the plurality of sub-images to a plurality of second neural networks, each of the second neural networks determining a respective position of the object of interest, such that the plurality of second neural networks determine a respective plurality of second positions of the object of interest; and statistically analyzing the plurality of second positions to determine an output position of the first object of interest.

Certain embodiments of the present disclosure relate to a device for identifying objects in an image. The device includes an input interface that receives an image having one or more objects of interest and at least one storage device configured to store the image. The device also includes one or more processors configured to: use a first neural network to identify an approximate position of an object of interest; identify, based on the identified approximate position, a section of the image that includes the object of interest; obtain a plurality of sub-images corresponding to the identified section of the received image; apply the plurality of sub-images to a plurality of second neural networks, each of the second neural networks determining a respective position of the object of interest, such that the plurality of second neural networks determine a respective plurality of second positions of the object of interest; and statistically analyze the plurality of second positions to determine an output position of the object of interest.

Certain embodiments of the present disclosure relate to a non-transitory computer-readable medium storing computer-executable instructions that when executed by one or more processors cause the one or more processors to perform a method for identifying objects in an image. The method includes: receiving an image having one or more objects of interest; using a first neural network to identify an approximate position of an object of interest in the received image; identifying, based on the identified approximate position, a section of the received image that includes the object of interest; obtaining a plurality of sub-images corresponding to the identified section of the received image; applying the plurality of sub-images to a plurality of second neural networks, each of the second neural networks determining a respective position of the object of interest, such that the plurality of second neural networks determine a respective plurality of second positions of the object of interest; and statistically analyzing the plurality of second positions to determine an output position of the object of interest.

Additional features and advantages of the present disclosure will be set forth in part in the following detailed description, and in part will be obvious from the description, or may be learned by practice of the present disclosure. The features and advantages of the present disclosure will be realized and attained by means of the elements and combinations particularly pointed out in the appended claims.

It is to be understood that the foregoing general description and the following detailed description are exemplary and explanatory only, and are not restrictive of the invention, as claimed.

BRIEF DESCRIPTION OF THE DRAWINGS

The accompanying drawings, which constitute a part of this specification, illustrate several embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts.

Systems and methods consistent with the present disclosure are directed to identifying an object of interest in an image or a series of images, including a medical image or a series of medical images. In a medical image the object of interest may include a tumor, an organ, etc. In some embodiments, the object of interest may include a fiducial marker.

For example, an object shown in the medical image may be classified/identified in a binary manner: e.g., the object is present or is not present. In another example, the classification/identification may be carried out based on probability or likelihood. In some embodiments, an object may be identified as being, for example, highly likely present, indicating a high probability that the object is in fact present. Similarly, an object may be identified as being less likely present. The probability or likelihood associated with a classification or identification may be described by a confidence measure, such as a percentage number, to quantify the probability or likelihood.

The spatial location of the object may be indicated by (X, Y) coordinates of the center of a bounding box e.g., a rectangle positioned to surround the object, or other appropriate coordinates if other spatial coordinate systems (e.g., cylindrical, spherical, etc.) are used.

The medical image(s) may include images generated from various image modalities. For example, the medical image(s) may include an angiography image, a magnetic resonance imaging (MRI) image, a computed tomography (CT) image, an ultrasound image, or the like. The medical image(s) may be 2D or 3D. A 3D image may include a plurality of 2D slices.

Figure 1:
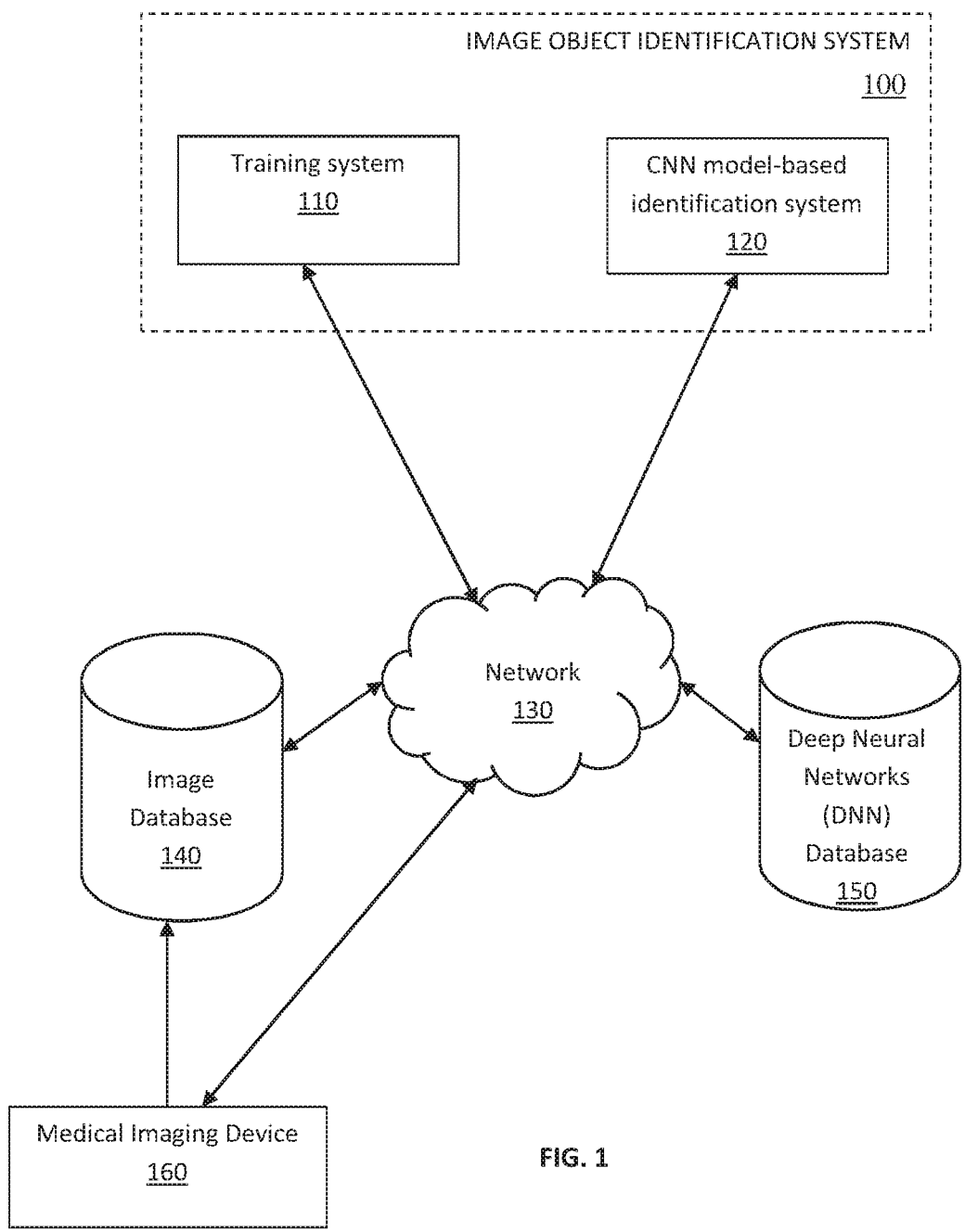
FIG. 1 is a block diagram showing an exemplary image object identification system, according to some embodiments of the present disclosure.

FIG. 1 is a block diagram showing an exemplary image object detection system 100, according to some embodiments of the present disclosure. As shown in FIG. 1, image object detection system 100 includes components for performing a training stage and an identification stage. To perform the training stage, image object detection system 100 includes a training system 110. To perform the identification stage, image object identification system 100 includes a convolutional neural network (CNN) model-based identification system 120. In some embodiments, image object detection system 100 may include greater or fewer of the components shown in FIG. 1. For example, when a CNN model for image object identification is pre-trained and provided, image object detection system 100 may only include CNN model-based identification system 120. Image object identification system 100 optionally communicates over a network 130. In some embodiments, network 130 may be replaced by wired data communication systems or devices. Communication network 130 may, for example be provided as a local area network (LAN); a wireless network; a cloud computing environment such as software as a service, platform as a service, infrastucture as a service; a client-server; a wide area network (WAN); or the like.

As shown in FIG. 1, training system 110 communicates with an image database 140 over network 130 to receive images for use in training to identify different objects. As shown in FIG. 1, training system 110 also communicates with a deep neural networks (DNN) database 150 over network 130 to save the trained neural networks developed by training system 110.

As shown in FIG. 1, CNN model-based identification system 120 communicates with DNN database 150 over network 130 to receive different trained neural networks to identify objects in an image. CNN model-based identification system 120 also communicates with image database 140 over network 130 to access one or more images containing objects.

In some embodiments, CNN model-based identification system 120 may be local with respect to a medical imaging device 160. For example, medical imaging device 160 and CNN model-based identification system 120 may be located in the same room of a medical facility/clinic. In other embodiments, medical imaging device 160 may be remote with respect to CNN model-based identification system 120 and the data communication may be carried out via a network 130. Similarly, the communication between training system 110 and medical imaging device 160 may also be implemented either locally or via network 130.

In some embodiments, CNN model-based identification system 120 and training system 110 may be implemented in a single data processing device, as indicated by the dashed line box in FIG. 1. For example, CNN model-based identification system 120 and training system 110 may be implemented as different software programs operating on the same hardware device. In other embodiments, identification system 110 and training system 120 may be implemented using different data processing devices.

Medical imaging device 160 may include an angiography device, a MRI imaging device, a CT imaging device, an X-ray imaging device, a positron emission tomography (PET) imaging device, an ultrasound imaging device, a fluoroscopic device, a single-photo emission computed tomography (SPECT) imaging device, or other medical imaging devices for obtaining one or more medical images of a patient. Accordingly, medical imaging device 160 may provide various kinds of medical images. For example, the medical images may include angiogram images, MRI images, CT images, PET images, C-ray images, ultrasound images, SPECT images, etc.

Figure 2:
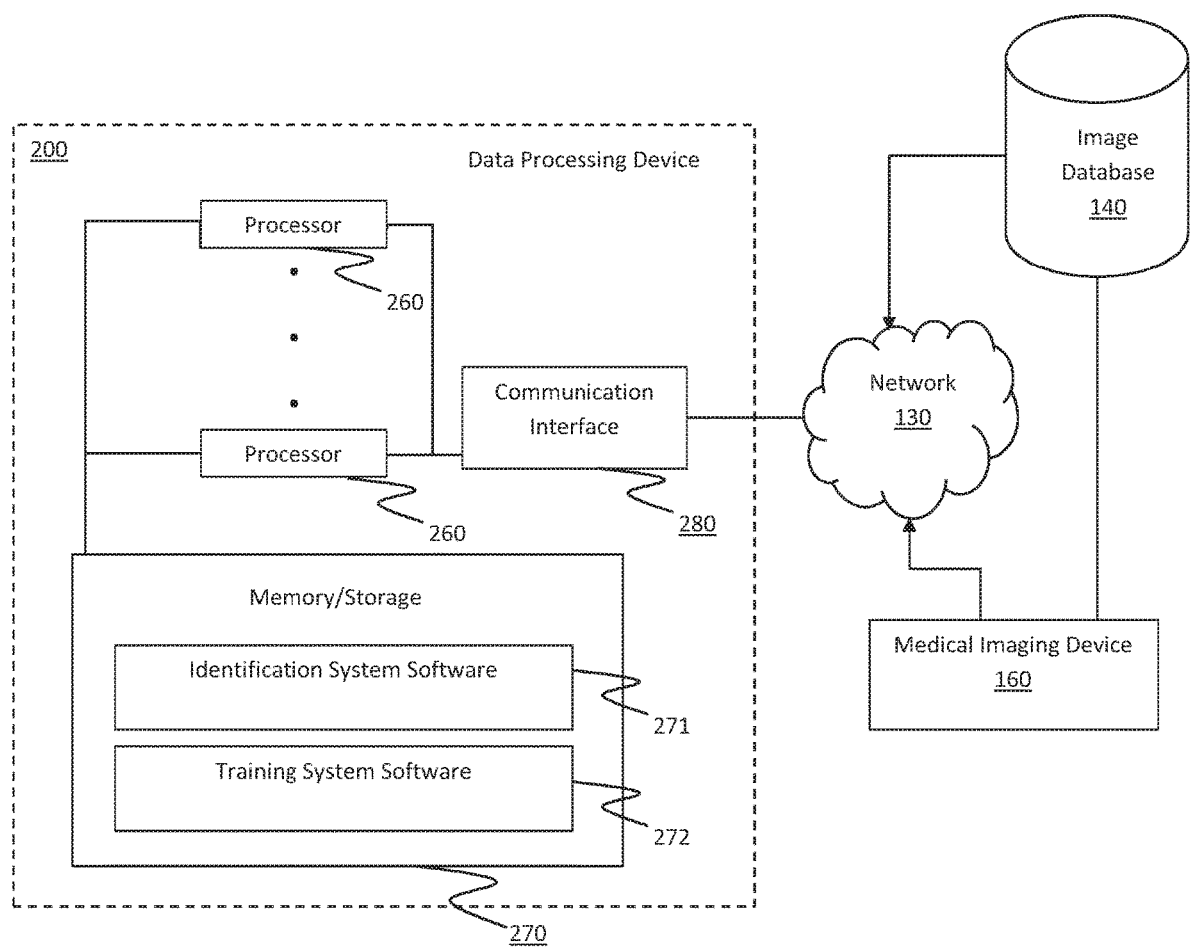
FIG. 2 is a block diagram showing an exemplary data processing device, according to some embodiments of the present disclosure.

FIG. 2 illustrates an embodiment of a data processing device 200. Data processing device 200 may implement each of the CNN model-based identification system 120 and training system 110, or both as image identification system 100. As shown FIG. 2, data processing device 200 includes one or more processors 260, a memory or storage device 270, and a communication interface 280. Memory/storage device 270 may store computer-executable instructions, such as identification system software 271 and training system software 272.

Processors 260 may include one or more processor units, or a single processor unit with one or more cores. As used herein, a "computing core" of processor 260 refers to either a processor unit or a core of a processor unit that is capable of executing instructions in a parallel-computing manner. For example, a computation task may be partitioned into multiple parallel branches or "threads", each branch/thread being executed by a computing core in parallel with other computing core(s).

Processor 260 is communicatively coupled to memory/storage device 270 and configured to execute the computer executable instructions stored therein. For example, processor 260 may execute identification system software 271 to implement functions of identification system 120. Processor 260 may also execute training system software 272 to implement functions of training system 110. Optionally, processor device 260 may execute training system software 272 that interfaces with identification system software 271.

Processor 260 communicates with image database 140. Image database 140 communicates with medical imaging device 160 and stores medical image data obtained by medical imaging device 160. One skilled in the art would appreciate that image database 140 may include a plurality of devices located either in a central or a distributed manner. Processor 260 also communicates with medical imaging device 160 directly through communication interface 280.

Processor 260 may include one or more general-purpose processing devices such as a microprocessor a central processing unit (CPU), a graphics processing unit (GPU), or the like. More particularly, processor 260 may include a Complex Instruction Set Computing (CISC) microprocessor, a Reduced Instruction Set Computing (RISC) microprocessor, a Very Long Instruction Word (VLIW) microprocessor, a processor implementing other instruction sets, or a processor implementing a combination of instruction sets. Processor 260 may also include one or more special purpose processing devices such as an Application Specific Integrated Circuit (ASIC), a Field Programmable Gate Array (FPGA), a Digital Signal Processor (DSP), a System on a Chip (SoC), or the like.

Memory/storage device 270 may include a read-only memory (ROM), a flash memory, a random access memory (RAM), a static memory, a flash memory, a hard drive, etc. In some embodiments, memory/storage device 270 includes a computer-readable medium. While the computer-readable medium in an embodiment may be a single medium, the term "computer-readable medium" should be taken to include a single medium or multiple media (e.g., a centralized or distributed database, and/or associated caches and servers) that store the one or more sets of computer-executable instructions or data. The term "computer-readable medium" shall also be taken to include any medium that is capable of storing or encoding a set of instructions for execution by a computer such as the one or more processors 260, and that cause the computer to perform any one or more of the methodologies of the present disclosure. The term "computer-readable medium" should, accordingly, be taken to include, but not be limited to, solid-state memories, optical, and magnetic media.

Communication interface 280 may include a network adaptor, a cable connector, a serial connector, a USB connector, a parallel connector, a high-speed data transmission adaptor, such as fiber, USB 3.0, thunderbolt, and the like. Interface 280 may also include a wireless network adaptor, such as WiFi adaptor, a telecommunication (3G, 4G, LTE and the like) adaptor, and the like. Communication interface 280 may provide the functionality of a local area network (LAN), a wireless network, a cloud computing environment (e.g., software as a service, platform as a service, infrastructure as a service, etc.), a client-server, a wide area network (WAN), and the like. Communication interface 280 communicates with medical imaging device 160 and image database 120 through network 130. Processors 260 may communicate with image database 120 and medical imaging device 160 via communication interface 280.

Figure 3:
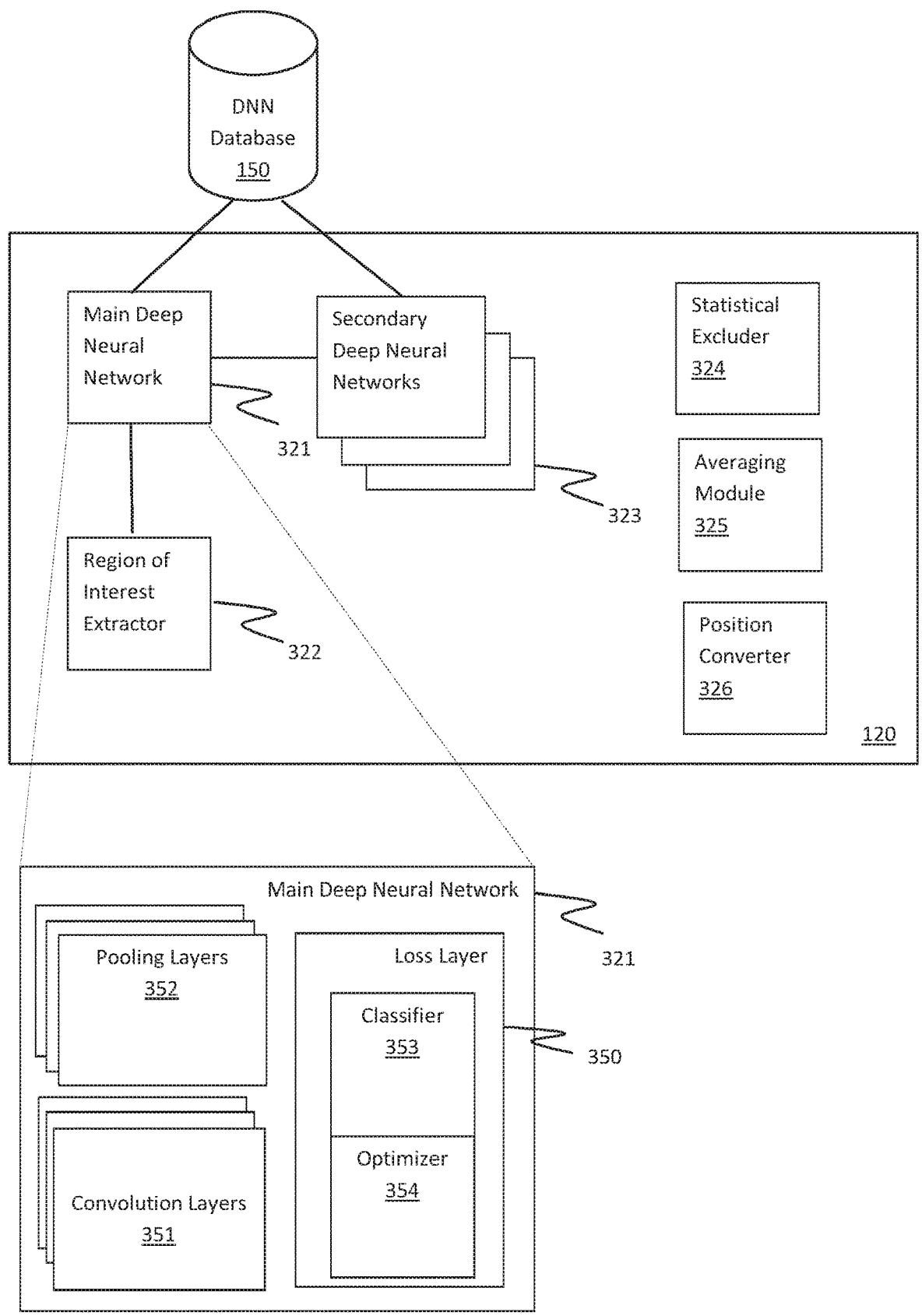
FIG. 3 depicts an exemplary convolutional neural network (CNN) model based identification system, according to some embodiments of the present disclosure.

FIG. 3 depicts an exemplary CNN model-based identification system 120. The identification system 120's functionality is performed in three stages: identifying an approximate position of an object of interest in an image, determining secondary positions of the object of interest in a sub-section of the image, and statistically analyzing secondary positions. To perform identification of the approximate position of an object of interest in an image, identification system 120 includes a main deep neural network 321. Main deep neural network 321 communicates with a region of interest extractor 322 to extract a sub-section of the image which includes the approximate position, in order to identify the approximate position of the object in the image. To perform identification of secondary positions of the object in the sub-section of the image, identification system 120 includes one or more secondary deep neural networks 323. To perform the final stage of statistical analysis of the secondary positions, identification system 120 includes a statistical excluder 324, an averaging module 325, and a position converter 326. Each processor 260 may be running on a different data processing device 200.

Each neural network in secondary deep neural networks 323 may be applied to a different sub-section of the image extracted by region of interest extractor 322. The number of secondary deep neural networks 323 may be determined by the shape of the object of interest. The number of secondary deep neural networks may also be determined by the type of the image supplied.

As shown in FIG. 3, an expanded view of main deep neural network 321 includes multiple sub-units that include convolution layers 351, and pooling layers 352. Each neural network optionally includes a loss layer 350 that includes a classifier unit 353. Loss layer 350 also includes a optimizer unit 354. Each of the neural networks which are part of secondary deep neural networks 323 may include sub-units similar to main deep neural network 321. Each of the sub-units may be implemented as separate software or as part of one integral software unit.

The CNN model-based identification system 120 identifies an object of interest in a given image by first selecting the main deep neural network 321. The main deep neural network 321 and secondary deep neural networks 323 may be executed on the same data processing device 200 or on separate data processing devices 200.

Figure 4:
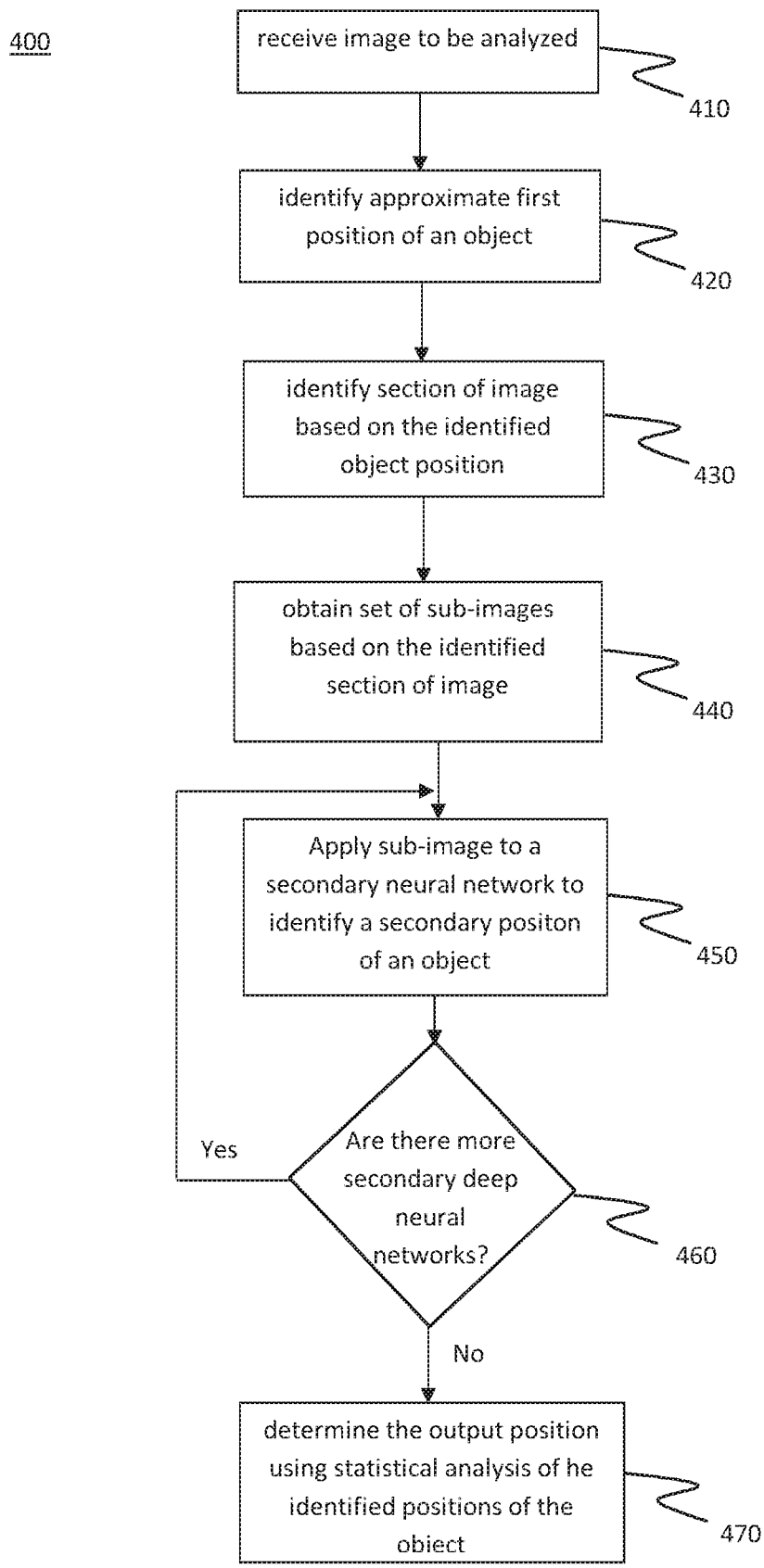
FIG. 4 is a flow chart illustrating an exemplary object identification method, performed by identification system software depicted in FIG. 2, according to an exemplary embodiment.

FIG. 4 is a flow chart illustrating an exemplary object identification method 400, according to some embodiments of the present disclosure. In some embodiments, method 400 may be performed by components of image object identification system 100, on data processing device 200, to identify one or more objects of interest. Although identification of only one object of interest is described as an example, it is contemplated that method 400 can be applied to identify a group of objects of interest at the same time.

As shown in FIG. 4, in step 410, data processing device 200 accesses from image database 140 an image sent by the medical imaging device 160. The data processing device 200 may also receive the image directly from medical imaging device 160. The received image may be stored temporarily in memory/storage 270.

In step 420, main deep neural network 321, which is part of the identification system 120, identifies the approximate position of the object in the image received in step 410 and stored in memory 270.

In step 430, a sub-section of the image is identified based on the approximate position of the object determined in step 420 by the main deep neural network 321.

In step 440, a set of sub-images based on the sub-section extracted in step 430 are obtained by region of interest extractor 322. In one embodiment, the number of sub-images matches the number of secondary deep neural networks 323. In one embodiment the sub-images are obtained using region of interest extractor 322 by adding different amounts of margin to the identified section of the image in step 430. In one embodiment an equal amount of margin is added to top, left, right and bottom sides of the identified section of the image. If adding margin results in crossing the boundary of a particular side of the image, then the margin amount s reduced to match the boundary of the particular side.

In step 450, a sub-image obtained in step 440 is provided as input to a neural network in secondary deep neural networks 323. The number of sub-images obtained may depend on the number of neural networks in secondary deep neural networks 323. In one embodiment, the number of sub-images obtained in step 440 and the number of neural networks in secondary deep neural networks 323 is the same. In one embodiment, respective sub-images obtained in step 440 may differ in size. The obtained sub-images may optionally differ in resolution, color, brightness, contrast, saturation and other image characteristics.

At step 460, a conditional check is made to determine whether there is a neural network in secondary deep neural networks 323 to which a sub-image obtained in step 440 needs to be applied. If the determination is 'yes' then step 450 is executed again and a sub-image is applied to the identified neural network in secondary deep neural networks 323. If not, the method proceeds to step 470.

In step 470, secondary positions obtained iteratively in steps 450-460 are statistically analyzed to determine the position of the object of interest in the image. In some embodiments, the statistical analysis includes determining the average position of the object by averaging module 325 based on the secondary positions of the object identified by secondary deep neural networks 323 in step 450. In some embodiments, statistical analysis may be performed by statistical excluder 324 to exclude some of the secondary positions obtained in step 450. In some embodiments, the statistical excluder 324 may determine the standard deviation of secondary positions and exclude only those positions which deviate more than one standard deviation from a mean position among secondary positions. Averaging module 325 calculates the average position based on the secondary positions not excluded by statistical excluder 324.

Figure 5:
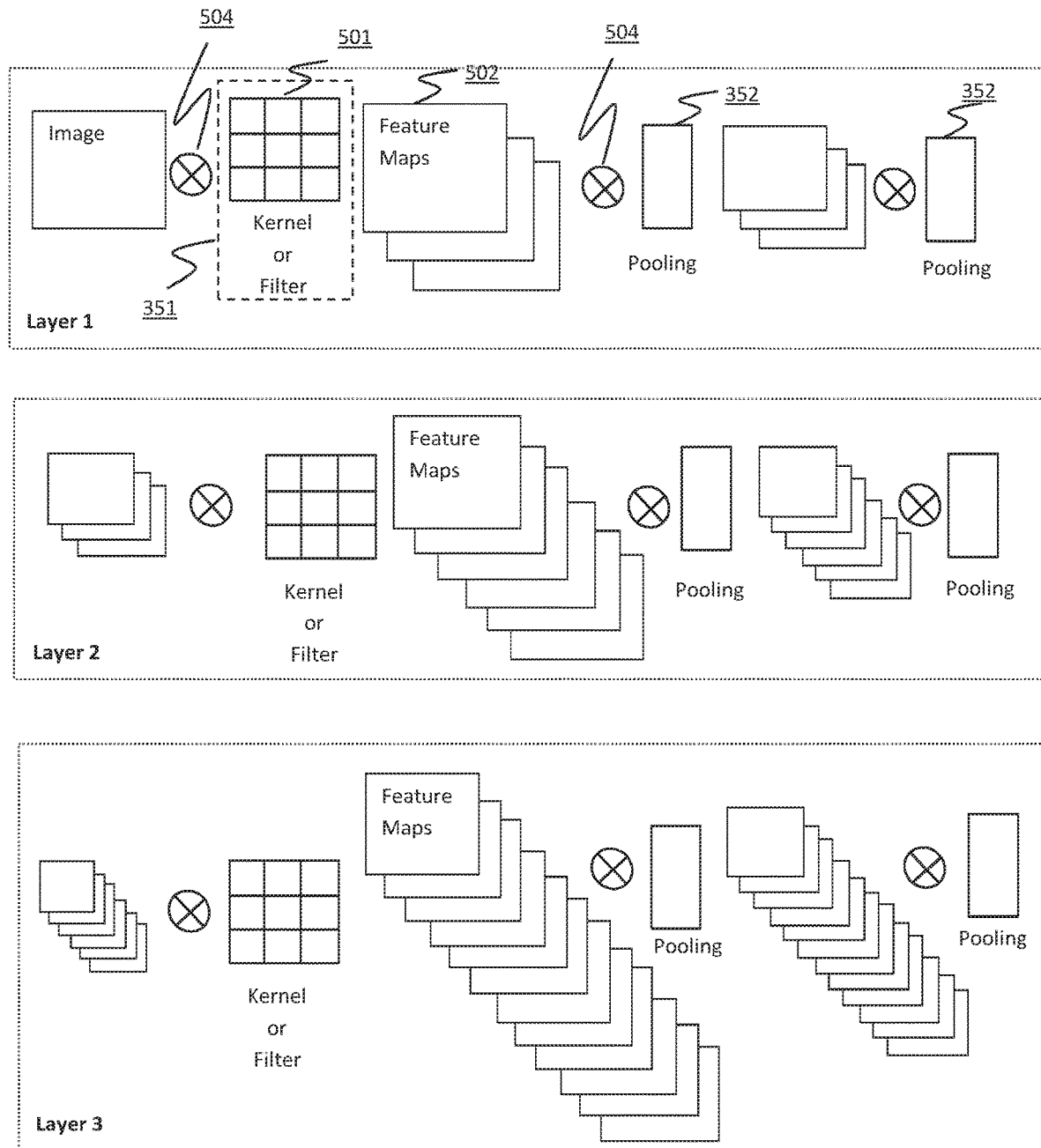
FIG. 5 illustrates a process by which a main deep neural network analyzes an image, according to some embodiments of the present disclosure.

FIG. 5 illustrates a process by which main deep neural network 321 analyzes an image to identify the approximate position of an object in step 420, according to some embodiments of the present disclosure. As shown in FIG. 5, in some embodiments, main deep neural network 321 has three layers of similar composition each including convolution layers 351, and pooling layers 352. The three layers are labeled Layer 1, Layer 2, and Layer 3. An output of each layer is input to the next layer. For example and without limitation, as shown in FIG. 5, main deep neural network 321 may use a 3×3 kernel 501 in convolution layers 351 followed by sub-sampling twice using pooling layers 352.

Kernel 501 helps filter relevant sections of the image and creates a set of feature maps 502. In some embodiments, each of feature maps 502 may be sub-sampled using pooling layers 352. The final set of sub-sampled images is used to identify an approximate position of the object in the image.

As show in FIG. 5, in each of the layers 1-3, input to and output of convolution layers 351 and pooling layers 352 are represented by matrices. Applying convolution layers 351 or pooling layers 352 to their respective inputs (on the right hand side) is depicted by application symbol 504.

Figure 6:
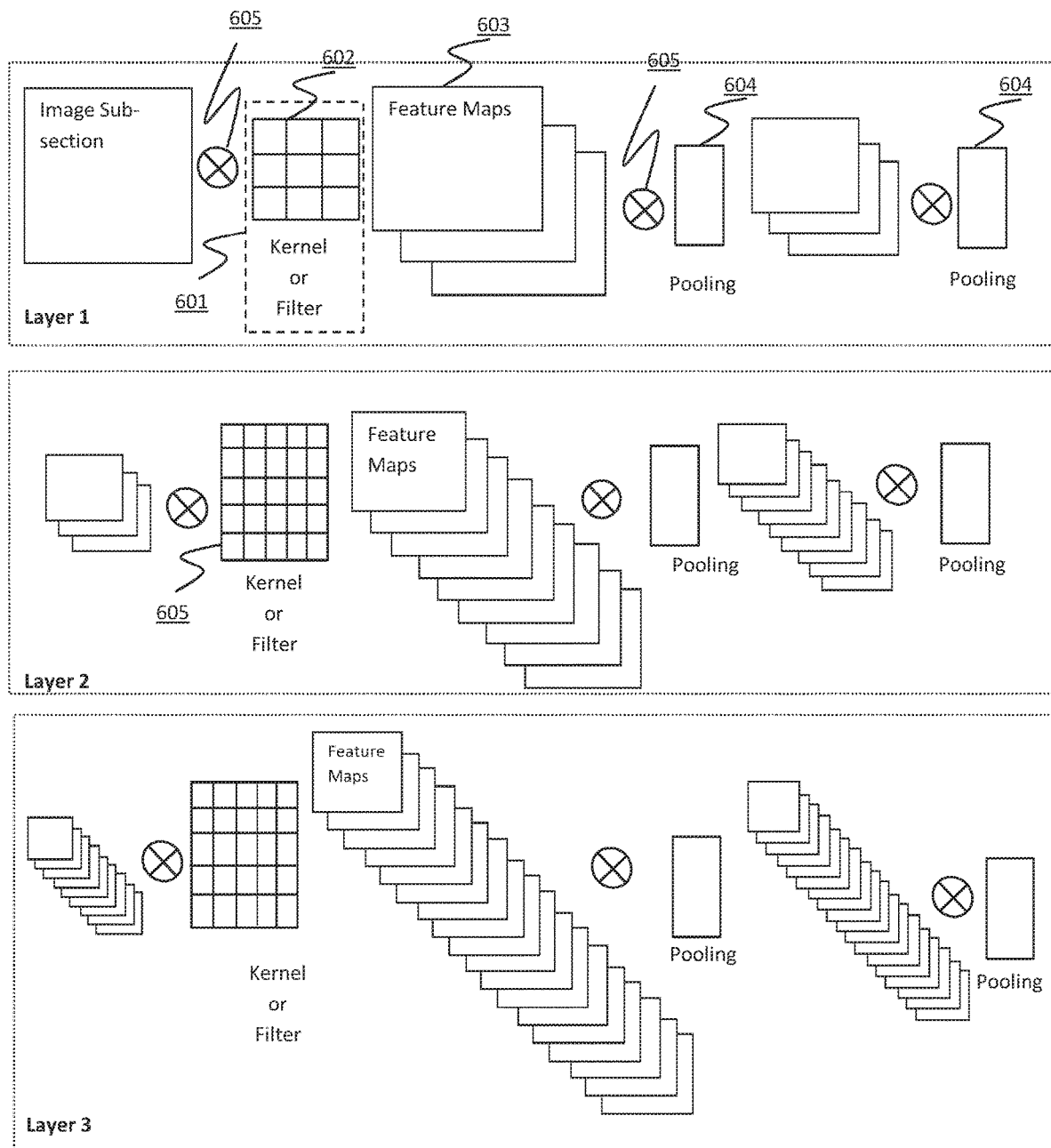
FIG. 6 illustrates a process by which a secondary deep neural network analyzes a sub-section of an image, according to some embodiments of the present disclosure.

FIG. 6 illustrates a process by which a neural network in secondary deep neural networks 323 analyzes a sub-section of the image to identify a secondary position of step 450 of method 400, according to some embodiments of the present disclosure. The sub-section of the image is determined based on the identified approximate position by main deep neural network 321, as shown in FIG. 5. As shown in FIG. 6, in some embodiments, secondary deep neural network 323 has three layers, each including a convolution layer 601 and pooling layers 604 respectively. The three layers are labeled Layer 1, Layer 2, and Layer 3. An output of each layer is input to the next layer. For example and without limitation, as shown in FIG. 6, secondary deep neural networks 323 may use a 3×3 kernel 602 in convolution layer 601 followed by sub-sampling twice using pooling layers 604.

Kernel 602 helps filter relevant sections of the image and creates a set of feature maps 603. In some embodiments, each of feature maps 603 may be sub-sampled using pooling layers 604. In some embodiments, a neural network in secondary deep neural networks 323 may use a 5×5 kernel 605 to filter certain set of features included in feature maps.

As show in FIG. 6, in each of the layers 1-3, input to and output of convolution layer 601 and pooling layers 602 are represented by matrices. Applying convolution layer 601 or pooling layers 602 to their respective inputs (on the right hand side) is depicted by application symbol 605.

Figure 7:
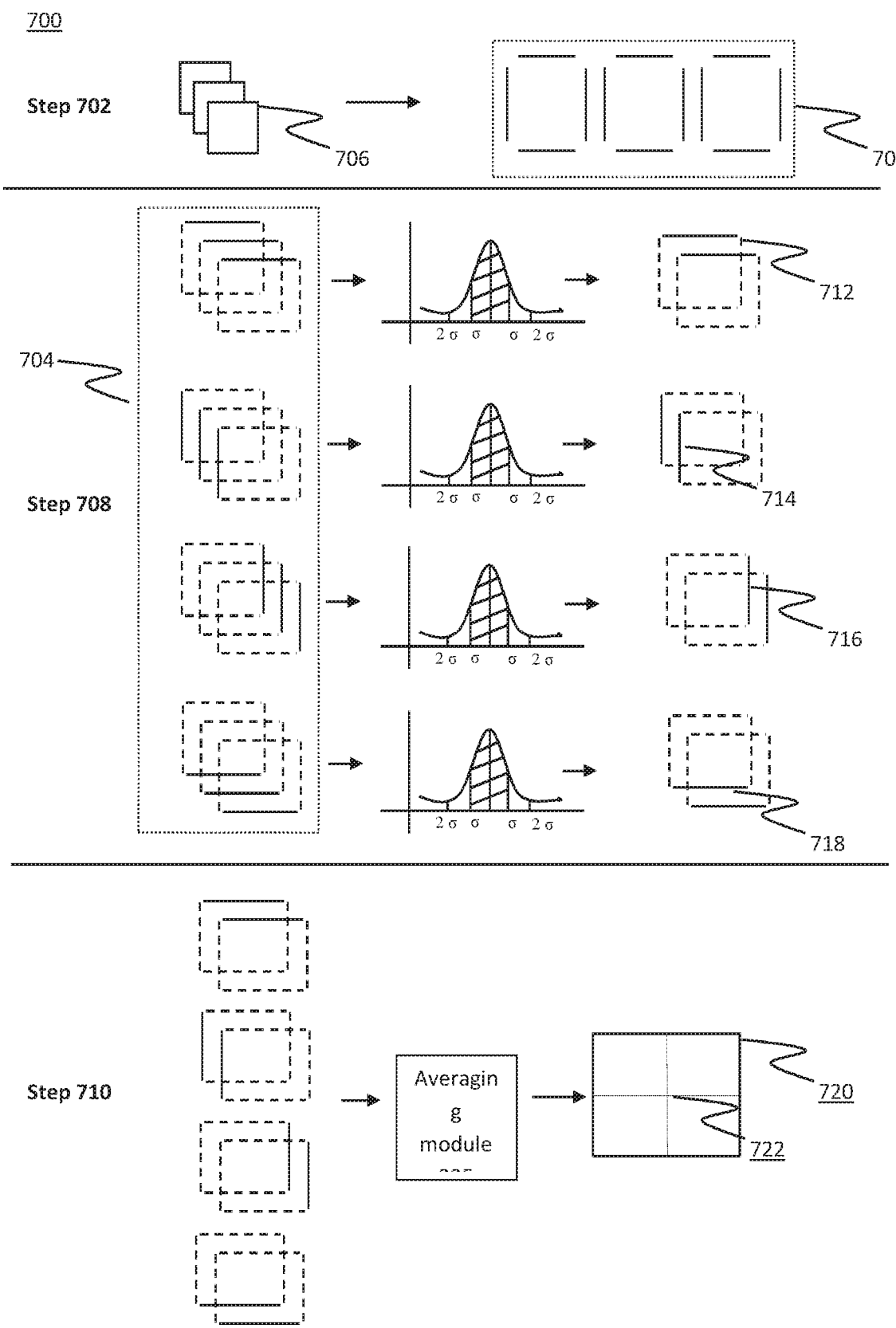
FIG. 7 illustrates a statistical analysis process for fine tuning an identified object position, according to some embodiments of the present disclosure.

FIG. 7 illustrates a statistical analysis process 700 performed by data processing device 200 for accurate identification of object position in an image according to some embodiments of the present disclosure. As shown in FIG. 7, in some embodiments, the secondary positions obtained in step 450 of method 400 by applying secondary deep neural networks 323 to the sub-images, are statistically analyzed in step 470 using a three step process. In some embodiments, the secondary positions are represented by bounding boxes such as bounding rectangles 711 around the object in the sub-image.

In step 702, sides 704 of the bounding rectangles 706 are used to calculate the respective standard deviations of top, left, right, and bottom sides using statistical excluder 324. In step 708, the sides 708 of the rectangles 706 are compared against the standard deviation of each side obtained in step 702 by statistical excluder 324. Any side which deviates less than one standard deviation is included in calculating the location of the object in step 710. The process of including/excluding sides by the standard deviation criterion serves to filter the respective sides to yield filtered sides 712-718 corresponding to the four sides 704 of the rectangles 706. In step 710, the filtered sides 712-718 are used to calculate the average sides using averaging module 325. The average sides determined by averaging module 325 are used to construct an average rectangle 720. A center 722 of average rectangle 720 is the position of the object in the image according to image object identification system 100. In some cases a side may fall outside one standard deviation and the average rectangle 720 may be missing a side, in which case center 722 is calculated from the available sides.

Figure 8:
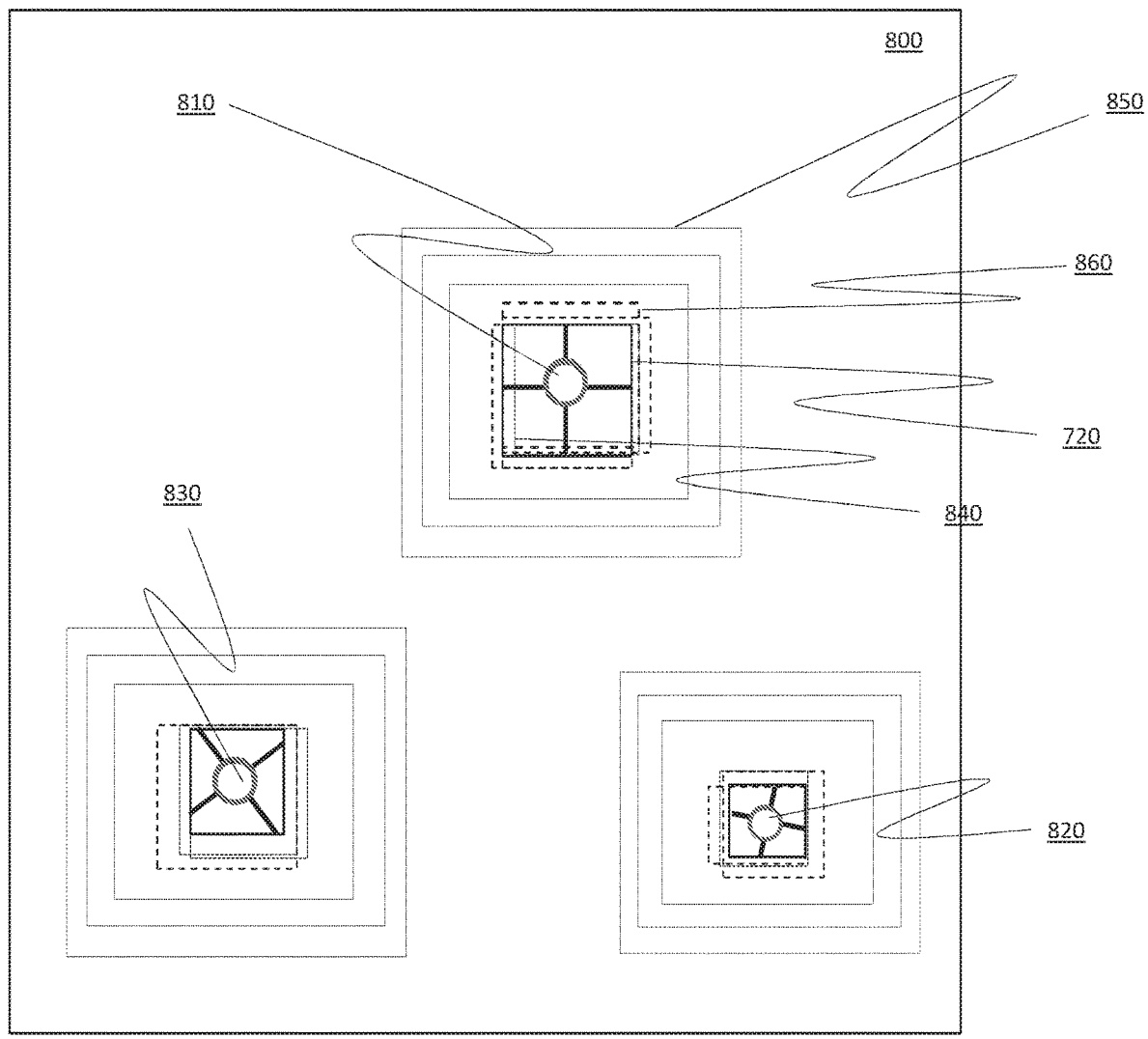
FIG. 8 is an illustration of a medical image with identified markers.

FIG. 8 shows an illustration of a medical image 800 including output of fiducial markers 810, 820, and 830 identified by the identification system 120. As shown in FIG. 8, each of three fiducial markers 810, 820, 830 is an object of interest indicated by a smaller white circle surrounded by a larger grey circle. As shown in FIG. 8, in some embodiments the approximate position identified by main deep neural network 321 and secondary deep neural networks 323 is shown using a bounding rectangle as a bounding box. An exemplary rectangle 840 indicates the section of the image identified by main deep neural network 321 as the location of the object in step 430. An exemplary rectangle 850 indicates the sub-section of the image extracted by region of interest extractor 322 in step 440 of method 400. Rectangle 860 indicates the location of the object identified by a neural network in secondary deep neural networks 323 in step 450 of method 400. A set of sub-images obtained in step 440 of method 400 are indicated by rectangles of different sizes. The co-ordinates of the rectangles are input to statistic excluder 324 resulting in filtered sides 712-718 which are within one standard deviation. Filtered sides 712-718 are input to averaging module 325 to construct average rectangle 720. Center 721 of average rectangle 720 is input to the position converter 326 to translate the coordinates to the original co-ordinates in medical image 800 indicated by circle 810 as an object of interest.

Figure 9:
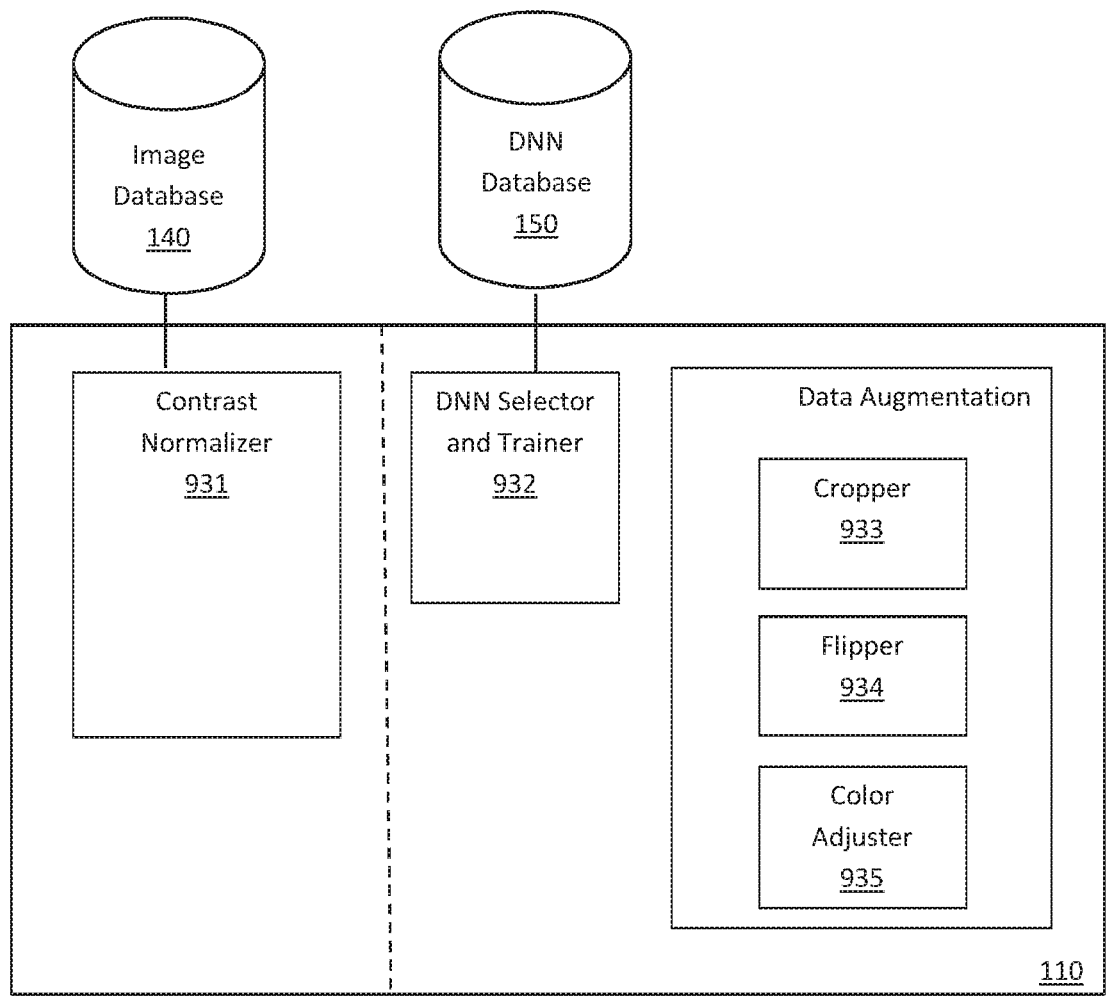
FIG. 9 depicts an exemplary training system, according to some embodiments of the present disclosure.
Figure 10:
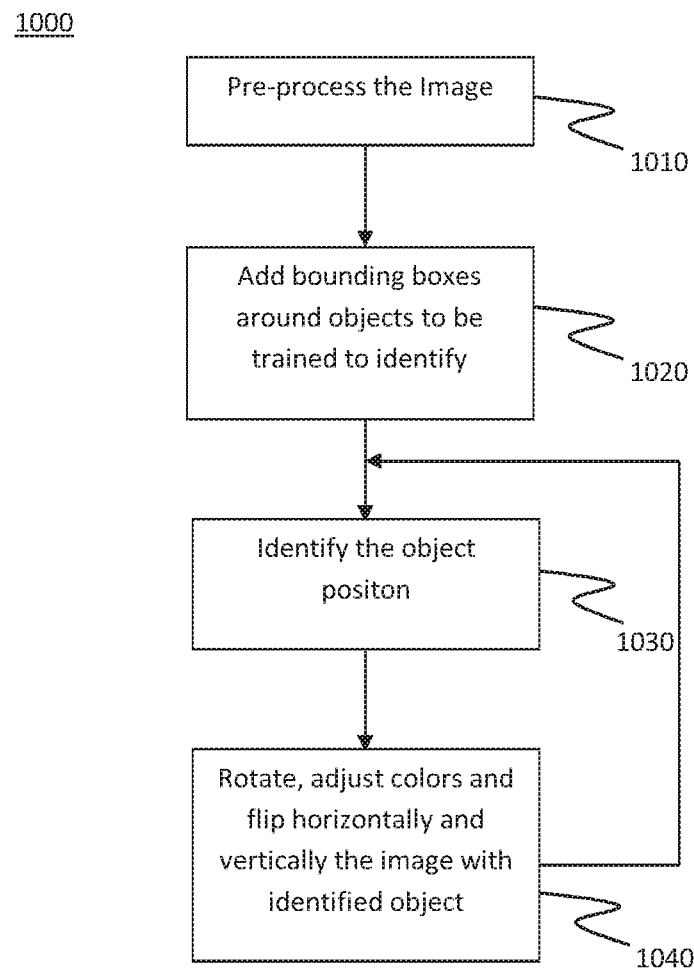
FIG. 10 is a flow chart illustrating an exemplary training method, performed by the training system of FIG. 9, according to an exemplary embodiment.

FIG. 9 depicts an exemplary configuration of model-based training system 110. System 110 includes multiple units. Each of the units may be implemented as a separate software module or be part of single software module. The units may run on different data processing devices 200. In some embodiments, a contrast normalization module 931 pre-processes an image to aid in identification of a position of an object of interest. In some embodiments, a DNN selector and trainer 932 may select the main deep neural network 321 for training. DNN selector and trainer 912 may also select the secondary deep neural networks 323 for training. DNN selector and trainer 932 may request DNN database 150 to provide the neural network to be trained. DNN selector and trainer 932 then trains the selected neutral network. An example of a training method is shown in FIG. 10 and described below. DNN selector and trainer 932 saves each trained main deep neural network 321 and secondary deep neural networks 323 to DNN database 150.

In some embodiments, the image used in training is modified using data augmentation tools such as a cropper 933, a flipper 934, and a color adjuster 935. The constraint of limited medical image availability can be resolved using the data augmentation tools. Cropper 933 crops the section of the image which has the object of interest, to obtain a smaller section of the image. Flipper 934 may in some cases flip the image horizontally or vertically to create new images. Color adjuster module 935 may modify the brightness, contrast, saturation and other image characteristics to create new images. Images generated by data augmentation tools are saved to image database 120 for future training. Some or all of the data augmentation tools are used together during the training stage. One or more data augmentation tools may be applied to an image in any order. Each data augmentation tool may be applied more than once to an image used for training neural networks. In some embodiments the image may be rotated multiple times to train the neural network to identify an object in an image irrespective of orientation. Data augmentation tools help improve the ability of the neural networks to identify an object in an image, irrespective of size, orientation and coarseness of the image.

FIG. 10 is a flow chart illustrating an exemplary training method 1000, performed by training system 110, according to an exemplary embodiment. In some embodiments, method 1000 may be performed by components of image object identification system 100, on data processing device 200, to train main deep neural network 321 and secondary deep neural networks 323.

Persons of ordinary skill will now appreciate that the present disclosure is not limited to devices and methods for identifying an object of interest in a medical image and may be practiced with equal effect for identifying an object of interest in other types of and classes of images.

As show in FIG. 10, in step 1010, data processing device 200 accesses an image from image database 140 and pre-processes the image using contrast normalization module 931. In step 1020, bounding boxes are added around objects to be identified in the image. The bounding boxes border the object in the image with no buffer between them. This trains the system to not expect extra space between boxes when it identifies an object in an image. In step 1030, an object is identified in the image by following steps in method 400. In step 1040, data augmentation tools 933-935 are applied to the image to obtain a modified image with different characteristics. Images obtained in step 1040 are used to identify the position of the object in each modified image.

Various operations or functions are described herein, which may be implemented or defined as software code or instructions. Such content may be directly executable ("object" or "executable" form), source code, or difference code ("delta" or "patch" code). Software implementations of the embodiments described herein may be provided via an article of manufacture with the code or instructions stored thereon, or via a method of operating a communication interface to send data via the communication interface. A machine or computer readable storage medium may cause a machine to perform the functions or operations described, and includes any mechanism that stores information in a form accessible by a machine (e.g., computing device, electronic system, and the like), such as recordable/non-recordable media (e.g., read only memory (ROM), random access memory (RAM), magnetic disk storage media, optical storage media, flash memory devices, and the like). A communication interface includes any mechanism that interfaces to any of a hardwired, wireless, optical, and the like, medium to communicate to another device, such as a memory bus interface, a processor bus interface, an Internet connection, a disk controller, and the like. The communication interface can be configured by providing configuration parameters and/or sending signals to prepare the communication interface to provide a data signal describing the software content. The communication interface can be accessed via one or more commands or signals sent to the communication interface.

The present disclosure also relates to a system for performing the operations herein. This system may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CDROMs, and magnetic-optical disks, read-only memories (ROMs), random access memories (RAMS), EPROMs, EEPROMs, magnetic or optical cards, or any type of media suitable for storing electronic instructions, each coupled to a computer system bus.

Embodiments of the present disclosure may be implemented with computer-executable instructions. The computer-executable instructions may be organized into one or more computer-executable components or modules. Aspects of the disclosure may be implemented with any number and organization of such components or modules. For example, aspects of the disclosure are not limited to the specific computer-executable instructions or the specific components or modules illustrated in the figures and described herein. Other embodiments may include different computer-executable instructions or components having more or less functionality than illustrated and described herein.

The words "comprising," "having," "containing," and "including," and other similar forms are intended to be equivalent in meaning and be interpreted as open ended, in that, an item or items following any one of these words is not meant to be an exhaustive listing of such item or items, or meant to be limited to only the listed item or items. In addition, the singular forms "a," "an," and "the" are intended to include plural references, unless the context clearly dictates otherwise.

Having described aspects of the embodiments in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A computer-implemented method for identifying an object in an image, the method comprising:
   receiving, by one or more processors, an image having one or more objects of interest;
   using a first neural network to identify an approximate position of an object of interest in the received image;
   identifying, by the one or more processors, based on the identified approximate position, a section of the received image that includes the object of interest;
   obtaining, by the one or more processors, a plurality of sub-images corresponding to the identified section of the received image;
   applying the plurality of sub-images to a plurality of second neural networks, each of the second neural networks determining a respective position of the object of interest, such that the plurality of second neural networks determine a respective plurality of second positions of the object of interest; and
   statistically analyzing the plurality of second positions to determine an output position of the object of interest.

2. The method of claim 1, wherein obtaining the plurality of sub-images corresponding to the identified section of the received image includes:
   creating a first sub-image by adding a first margin to the identified section of the image including the object of interest; and
   creating a second sub-image by adding a second margin of a different amount from the first margin to the identified section of the image including the object of interest.

3. The method of claim 1, further comprising:
   identifying, by the one or more processors, based on each determined second position in each of the sub-images a corresponding section of the sub-image that includes the object of interest; and
   determining bounding rectangles matching edges of each of the identified sections.

4. The method of claim 3, further comprising:
   determining average top, left, right, and bottom sides based on sides of the bounding rectangles;
   constructing an average rectangle using the average sides;
   calculating a center of the average rectangle;
   translating the center of the average rectangle to a position in the received image; and
   identifying the translated position as a position of the object of interest in the received image.

5. The method of claim 4, further comprising:
   determining standard deviations of top, left, right, and bottom sides based on the sides of the bounding rectangles of the identified sections of the sub-images; and
   removing sides of the bounding rectangles which are more than one standard deviation of the respective side.

6. The method of claim 1, wherein prior to receiving the image having one or more objects of interest, the method further includes:
   training, by one or more processors, the first neural network to learn to identify the approximate position of the object of interest in a training image; and
   training, by one or more processors, the plurality of second neural networks to learn to identify the position of the object of interest in the training image.

7. The method of claim 6, wherein the training of the first neural network to learn to identify the approximate position of the object of interest includes:
   pre-processing the training image by adjusting one or more color characteristics of the image.

8. The method of claim 6, wherein training the first neural network to learn to identify the approximate position of the object of interest includes:
   generating one or more images of the training image by:
      cropping a section of the training image which includes the object of interest,
      flipping the training image,
      rotating the training image, or
      adjusting color characteristics of the training image; and
   applying the generated image to the first neural network to identify the position of the object of interest in the generated image.

9. The method of claim 6, wherein training the second neural network to learn to identify the position of the object of interest includes:
   obtaining, by the one or more processors, a training sub-image including the position of the object of interest identified by the first neural network; and
   applying the training sub-image to the second neural network to determine a position of the object of interest.

10. A device for identifying objects in an image, the device comprising:
    an input interface that receives an image having one or more objects of interest;
    at least one storage device configured to store the received image; and
    one or more processors configured to:
       use a first neural network to identify an approximate position of an object of interest;
       identify, based on the identified approximate position, a section of the received image that includes the object of interest;
       obtain a plurality of sub-images corresponding to the identified section of the received image;
       apply the plurality of sub-images to a plurality of second neural networks, each of the second neural networks determining a respective position of the object of interest, such that the plurality of second neural networks determine a respective plurality of second positions of first object of interest; and statistically analyze the plurality of second positions to determine an output position of the object of interest.

11. The device of claim 10, wherein the one or more processors being further configured to:
    create a first sub-image by adding a first margin to the identified section of the image including the object of interest; and
    create a second sub-image by adding a second margin of a different amount from the first margin to the identified section of the image including the object of interest.

12. The device of claim 10, the one or more processors being further configured to:
    identify, based on each determined second position in each of the sub-images a corresponding section of the sub-image that includes the object of interest; and
    determine bounding rectangles matching edges of each of the each identified sections.

13. The device of claim 12, the one or more processors being further configured to:
    determine average top, left, right, and bottom sides based on sides of the bounding rectangles;
    construct an average rectangle using the average sides; and
    calculate center of the average rectangle; and
    translate a center of the average rectangle to a position in the received image; and
    identify the translated position as a position of the object of interest in the received image.

14. The device of claim 13, wherein the one or more processors being further configured to:
    determine standard deviation of top, left, right, and bottom sides based on the sides of the bounding rectangles of the identified sections of the sub-images; and
    remove sides of the bounding rectangles which are more than one standard deviation of the respective side.

15. The device of claim 10, wherein prior to receiving the image having one or more objects of interest the one or more processors are further configured to:
    train the first neural network to learn to identify the approximate position of the object of interest in a training image; and
    train the plurality of second neural networks to learn to identify the position of the object of interest in the training image.

16. The device of claim 15, wherein the one or more processors being further configured to:
    pre-process the training image by adjusting one or more color characteristics of the image.

17. The device of claim 15, wherein the one or more processors being further configured to:
    generate one or more images of the training image by:
        cropping a section of the training image which includes the object of interest,
        flipping the training image,
        rotating the training image, or
        adjusting color characteristics of the training image; and
    apply the generated image to the first neural network to identify the position of the object of interest in the generated image.

18. The device of claim 15, wherein the one or more processors being further configured to:
    obtain a training sub-image including the position of the object of interest identified by the first neural network; and
    apply the training sub-image to the second neural network to determine a position of the object of interest.

19. A non-transitory computer-readable medium storing instructions that, when executable by one or more processors, cause the one or more processors to perform a method for identifying an object in an image, the method comprising:
    receiving an image having one or more objects of interest;
    using a first neural network to identify an approximate position of an object of interest the received image;
    identifying based on the identified approximate position, a section of the received image that includes the object of interest;
    obtaining a plurality of sub-images corresponding to the identified section of the received image;
    applying the plurality of sub-images to a plurality of second neural networks, each of the second neural networks determining a respective position of the object of interest, such that the plurality of second neural networks determine a respective plurality of second positions of the object of interest; and
    statistically analyzing the plurality of second positions to determine an output position of the object of interest.

20. The non-transitory computer-readable medium of claim 19, wherein obtaining the plurality of sub-images corresponding to the identified section of the received image includes:
    creating a first sub-image by adding a first margin to the identified section of the image including the object of interest; and
    creating a second sub-image by adding a second margin of a different amount from the first margin to the identified section of the image including the object of interest.

21. The non-transitory computer-readable medium of claim 20 containing instructions that, when executable by the one or more processors, cause the one or more processors to perform a method prior to receiving the image having one or more objects of interest the one or more processors, the method comprising:
    training, by one or more processors, the first neural network to learn to identify the approximate position of the object of interest in a training image; and
    training, by one or more processors, the plurality of second neural networks to learn to identify the position of the object of interest in the training image.

22. The method of claim 21, wherein training of the first neural network to learn to identify the position of the object of interest includes:
    pre-processing the training image by adjusting one or more color characteristics of the image.

23. The method of claim 21, wherein training the first neural network to learn to identify the position of the object of interest includes:
    generating one or more images of the original image by:
        cropping a section of the training image which includes the object of interest,
        flipping the training image,
        rotating the training image, or
        adjusting color characteristics of the training image, and
    applying the generated image to the first neural network to identify the position of the object of interest in the generated image.

24. The method of claim 21, wherein training the second neural network to learn to identify the position of the object of interest includes:

obtaining, by the one or more processors, a training sub-image including the position of the object of interest identified by the first neural network; and applying the training sub-image to the second neural network to determine a position of the object of interest.

25. The non-transitory computer-readable medium of claim 19, wherein the method further comprises:

identifying, based on each determined second position in each of the sub-images a corresponding section of the sub-image that includes the object of interest; and determining bounding rectangle matching edges of each of the identified sections.

26. The non-transitory computer-readable medium of claim 25, wherein the method further comprises:

determining average top, left, right, and bottom sides based on sides of the bounding rectangles;

constructing an average rectangle using the average sides; and calculating center of the average rectangle; and translating the center of the average rectangle to a position in the received image; and identifying the translated position as a position of the object of interest in the received image.

27. The non-transitory computer-readable medium of claim 26, wherein the method further comprises:

determining standard deviation of top, left, right, and bottom sides based on the sides of the bounding rectangles of the identified sections of the sub-images; and removing sides of the bounding rectangles which are located more than one standard deviation of the respective side.

* * * * *